(12) United States Patent
Hirai et al.

(10) Patent No.: US 12,443,004 B2
(45) Date of Patent: Oct. 14, 2025

(54) OPTICAL APPARATUS AND IMAGE PICKUP APPARATUS

(71) Applicant: CANON KABUSHIKI KAISHA, Tokyo (JP)

(72) Inventors: Yuusuke Hirai, Saitama (JP); Yuma Iwasaki, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 543 days.

(21) Appl. No.: 17/900,550

(22) Filed: Aug. 31, 2022

(65) Prior Publication Data

US 2023/0071481 A1   Mar. 9, 2023

(30) Foreign Application Priority Data

Sep. 7, 2021 (JP) .................. 2021-145089

(51) Int. Cl.
*G02B 7/02* (2021.01)
*H04N 23/55* (2023.01)

(52) U.S. Cl.
CPC ............. *G02B 7/021* (2013.01); *G02B 7/022* (2013.01); *H04N 23/55* (2023.01)

(58) Field of Classification Search
CPC .......... G02B 7/02; G02B 7/021; G02B 7/022; G02B 7/023; G02B 7/025; G02B 7/026; G02B 7/04; H04N 23/55; H04N 23/54
See application file for complete search history.

(56) References Cited

U.S. PATENT DOCUMENTS

| 10,288,836 | B2 | 5/2019 | Shibasaki | |
|---|---|---|---|---|
| 2017/0176712 | A1* | 6/2017 | Shibasaki | ............... G02B 7/10 |
| 2018/0024311 | A1* | 1/2018 | Kageyama | ............... G02B 7/04 |
| | | | | 359/808 |

FOREIGN PATENT DOCUMENTS

| JP | 2017116632 A | 6/2017 |
|---|---|---|
| JP | 6415425 B2 | 10/2018 |

* cited by examiner

*Primary Examiner* — Ephrem Z Mebrahtu
(74) *Attorney, Agent, or Firm* — ROSSI, KIMMS & McDOWELL LLP (57) ABSTRACT

A lens apparatus comprises a fixed barrel, a movable barrel, a mechanism configured to move the movable barrel along an optical axis by rotation of the movable barrel around the optical axis, and an operating member disposed through the fixed barrel and rotationally operated. The operating member comprises a rotating shaft and an engaging portion eccentric from the rotating shaft. The rotating shaft is rotated with the operating member being rotationally operated, the engaging portion is engaged with a guide formed in the movable barrel along the optical axis. At least a part of the engaging portion is located outside the rotating shaft in a direction orthogonal to the rotating shaft. Rotation of the operating member causes the engaging portion to slide on the guide, the movable barrel to rotate around the optical axis, and the mechanism to move the movable barrel along the optical axis.

11 Claims, 8 Drawing Sheets

OPTICAL APPARATUS AND IMAGE PICKUP APPARATUS

BACKGROUND OF THE INVENTION

Field of the Invention

The present disclosure relates to an optical apparatus and an image pickup apparatus.

Description of the Related Art

Since the components of an optical apparatus such as a lens device have dimensional errors, the optical characteristics of the optical apparatus may deviate from the design values. For this reason, there is known a lens apparatus in which the position of the focus surface can be adjusted, for example, by adjusting the position of the movable final lens group in the optical axis direction (so-called flange back adjusting).

Japanese Patent No. 6415425 discloses a flange back adjusting mechanism in which rotation of a movable barrel about the optical axis is converted into movement in the optical axis direction of the movable barrel by a rotation linear motion converting mechanism such as a helicoid mechanism.

In the flange back adjusting mechanism disclosed in Japanese Patent No. 6415425, when the distance between the rotating shaft and the eccentric shaft of the operating portion is increased in order to increase the moving amount of the movable barrel in the optical axis direction, the operating portion is increased in size, and accordingly, the diameter of the circular hole portion of the fixed barrel through which the operating portion passes must be increased.

SUMMARY OF THE INVENTION

An aspect of embodiments provides, for example, an optical apparatus beneficial in small size and adjustment of optical characteristic thereof.

An aspect of embodiments provides an optical apparatus comprising: a fixed barrel; a movable barrel disposed inside the fixed barrel and holding an optical element; a mechanism configured to move the movable barrel along an optical axis by rotation of the movable barrel around the optical axis; and an operating member disposed through the fixed barrel and rotationally operated, wherein the operating member comprises a rotating shaft and an engaging portion eccentric from the rotating shaft, the rotating shaft being rotated with the operating member being rotationally operated, the engaging portion being engaged with a guide formed in the movable barrel along the optical axis; at least a part of the engaging portion is located outside the rotating shaft in a direction orthogonal to the rotating shaft; rotation of the operating member causes the engaging portion to slide on the guide, the movable barrel to rotate around the optical axis, and the mechanism to move the movable barrel along the optical axis.

Further features of the present invention will become apparent from the following description of exemplary embodiments with reference to the attached drawings.

DESCRIPTION OF THE EMBODIMENTS

Example

Preferred embodiments of the present invention will now be described in detail in accordance with the accompanying drawings.

Figure 1:
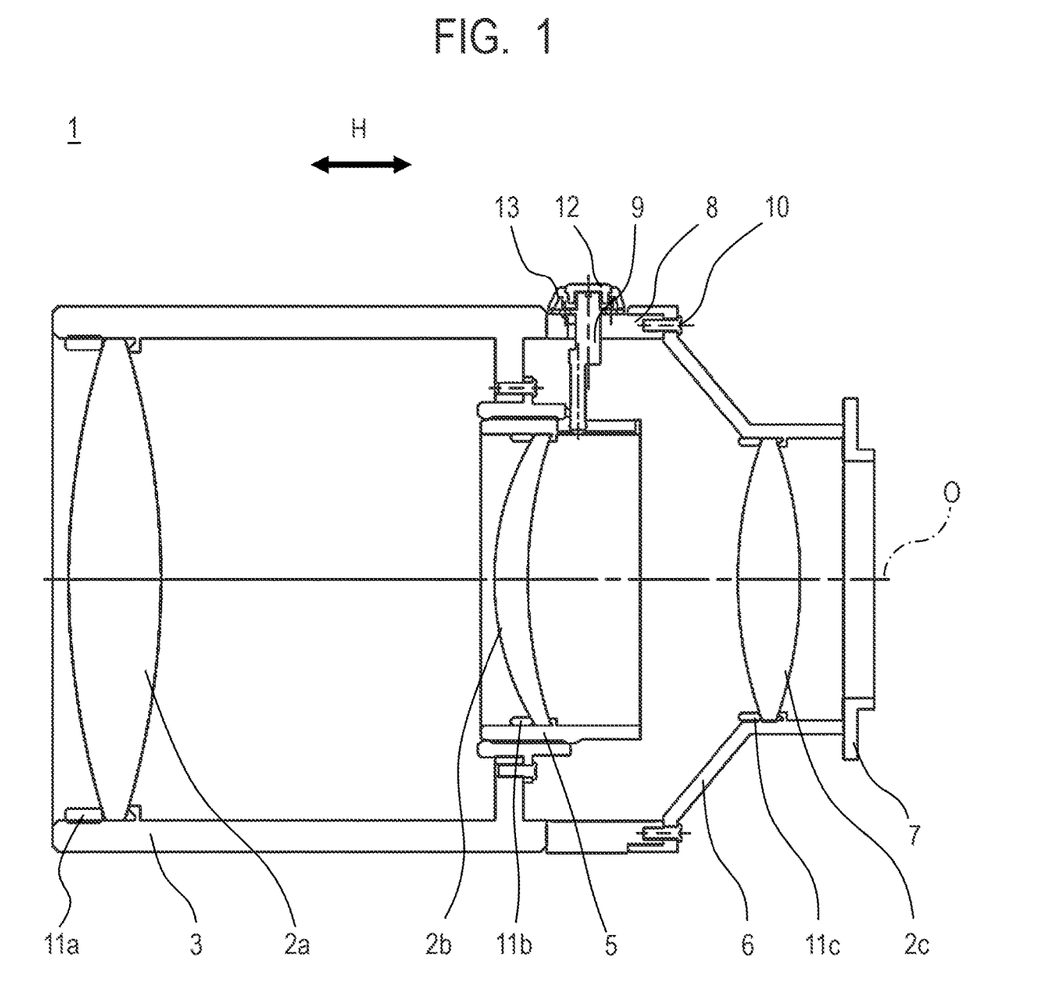
FIG. 1 is a cross-sectional view of a lens apparatus (1) according to an embodiment.

A lens apparatus 1 (optical apparatus) according to an embodiment of the present disclosure will be described below. FIG. 1 is a cross-sectional view of the lens apparatus 1 according to an embodiment of the present disclosure.

The lens apparatus 1 is provided with a plurality of optical elements, and the plurality of optical elements comprises a first lens 2a, a second lens 2b, and a third lens 2c. The first lens 2a as a front fixing group is fixed to a front fixed barrel 3, the second lens 2b as an object to be adjusted by a flange back adjusting unit described later is fixed to a movable barrel 5, and the third lens 2c as a relay group is fixed to a rear fixed barrel 6.

A lens mount 7 is provided at an end portion of the rear fixed barrel 6, and is connected to a mount portion of an image pickup apparatus (not illustrated) at the time of photographing. A fixed barrel 8 is provided between the front fixed barrel 3 and the rear fixed barrel 6. The fixed barrel 8 is provided with a flange back adjusting unit. The front fixed barrel 3 and the fixed barrel 8 are connected by a plurality of screws (not illustrated). The fixed barrel 8 and the rear fixed barrel 6 are connected by a plurality of screws 10. The movable barrel 5 for holding the second lens 2b is arranged inside the fixed barrel 8.

The first lens 2a is fixed to the front fixed barrel 3 by fastening a first pressing ring 11a to screw portions formed on the front fixed barrel 3. The second lens 2b is fixed to the movable barrel 5 by fastening a second pressing ring 11b to screw portions formed on the movable barrel 5. The third lens 2c is fixed to the rear fixed barrel 6 by fastening a third pressing ring 11c to screw portions formed on the rear fixed barrel 6. Although the lens apparatus 1 is not described in the embodiment, the lens apparatus 1 may be configured to be capable of focus adjustment, magnification, and light amount adjustment by a structure not illustrated.

Figure 2:
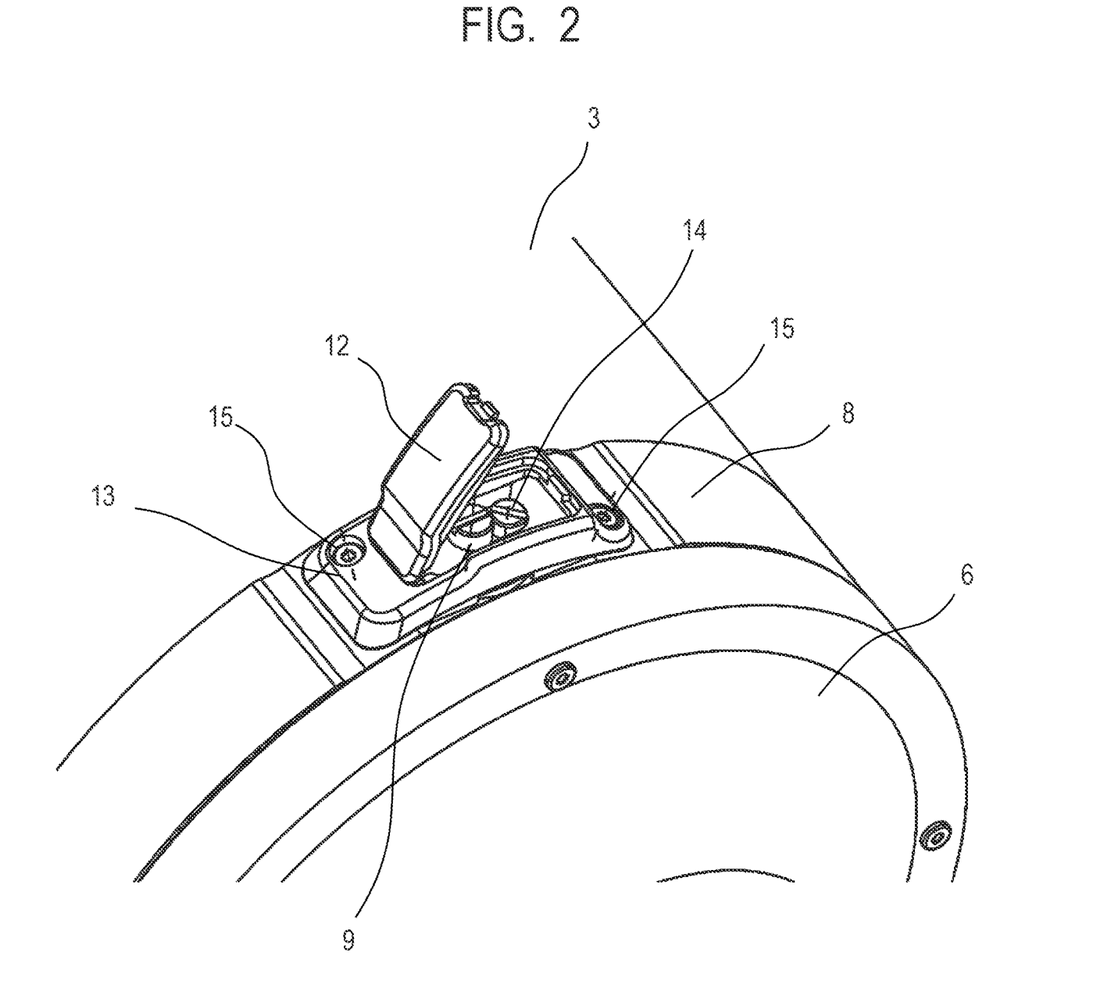
FIG. 2 is a perspective view of a flange back adjusting unit of the lens apparatus (1) of the embodiment.

Referring to FIGS. 1 and 2, the flange back adjusting unit will be described. FIG. 2 is a perspective view of a flange back adjusting unit of the lens apparatus 1. The flange back adjustment is performed by rotating an operating member 9 described later, and the operating member 9 is normally covered with a rubber cap 12 (second cap member) provided on a cover member 13. The cover member 13 is provided on an outer peripheral surface of the fixed barrel 8, and is provided so that the operating member 9 and a lock screw 14 (fixing member) are covered by fitting the rubber cap 12 to the cover member 13. The operating member 9 and the lock screw 14 are not exposed to the external surface by the rubber cap 12. The cover member 13 is made of resin or metal and is fixed to the outer peripheral surface of the fixed barrel 8 by two screws 15. The rubber cap 12 is an elastic member such as rubber or resin, and is press-fitted and fixed to the cover member 13. When the rubber cap 12 is removed, the operating member 9 and the lock screw 14 are exposed to the external surface.

Figure 3:
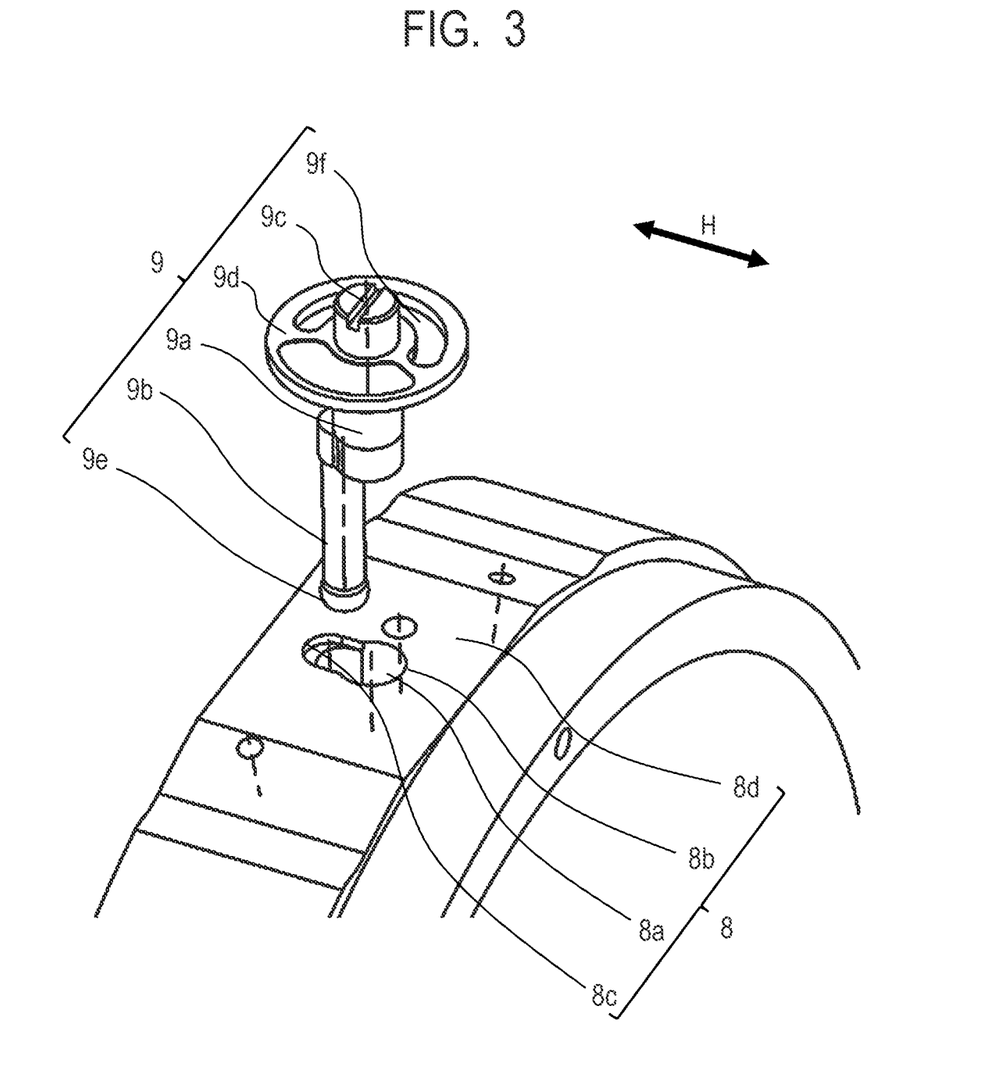
FIG. 3 is an exploded perspective view illustrating a state in which an operating member (9) of the embodiment is inserted into the fixed barrel (8).
Figure 4:
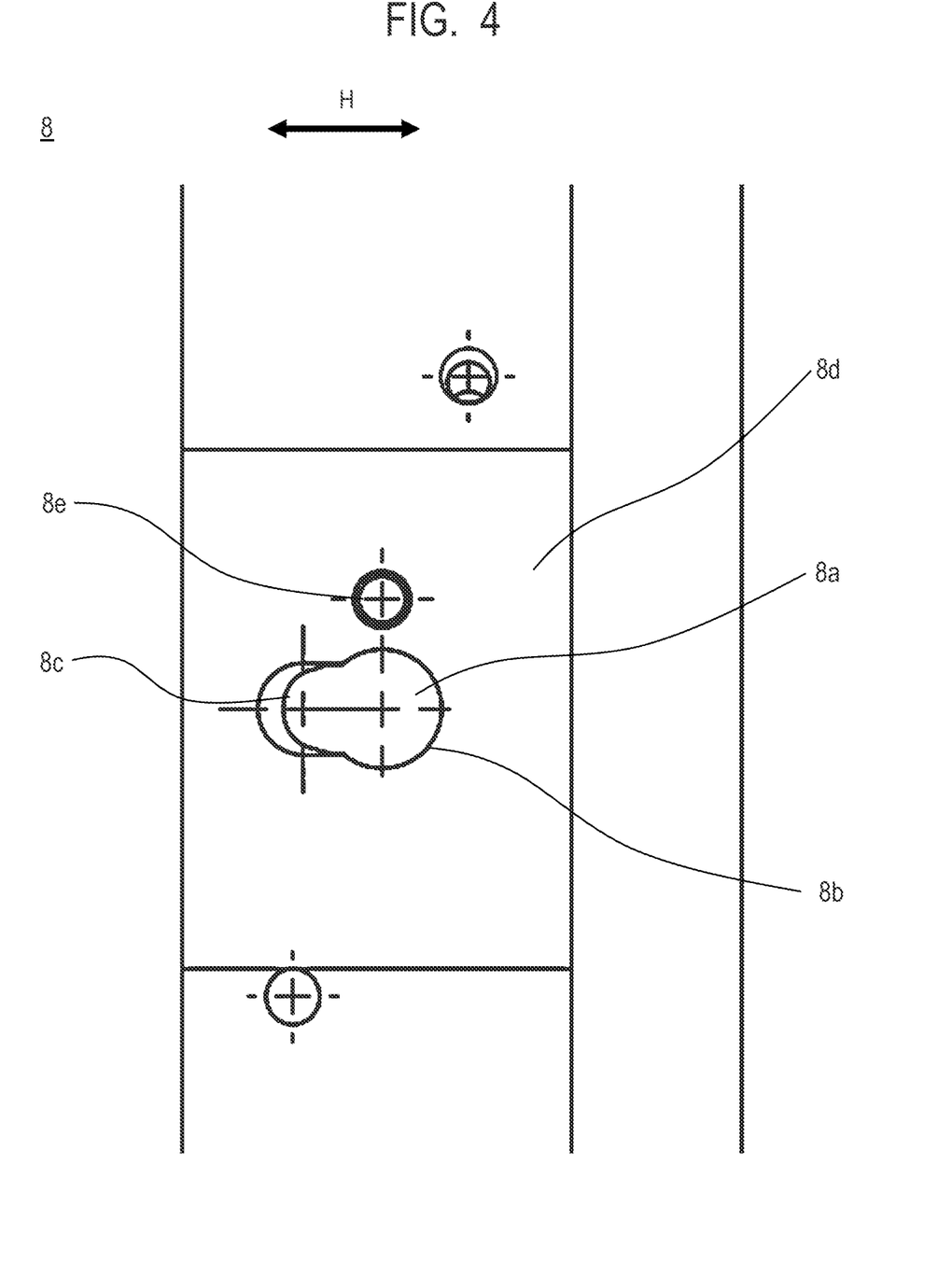
FIG. 4 is an enlarged view of a hole portion of the embodiment.
Figure 5:
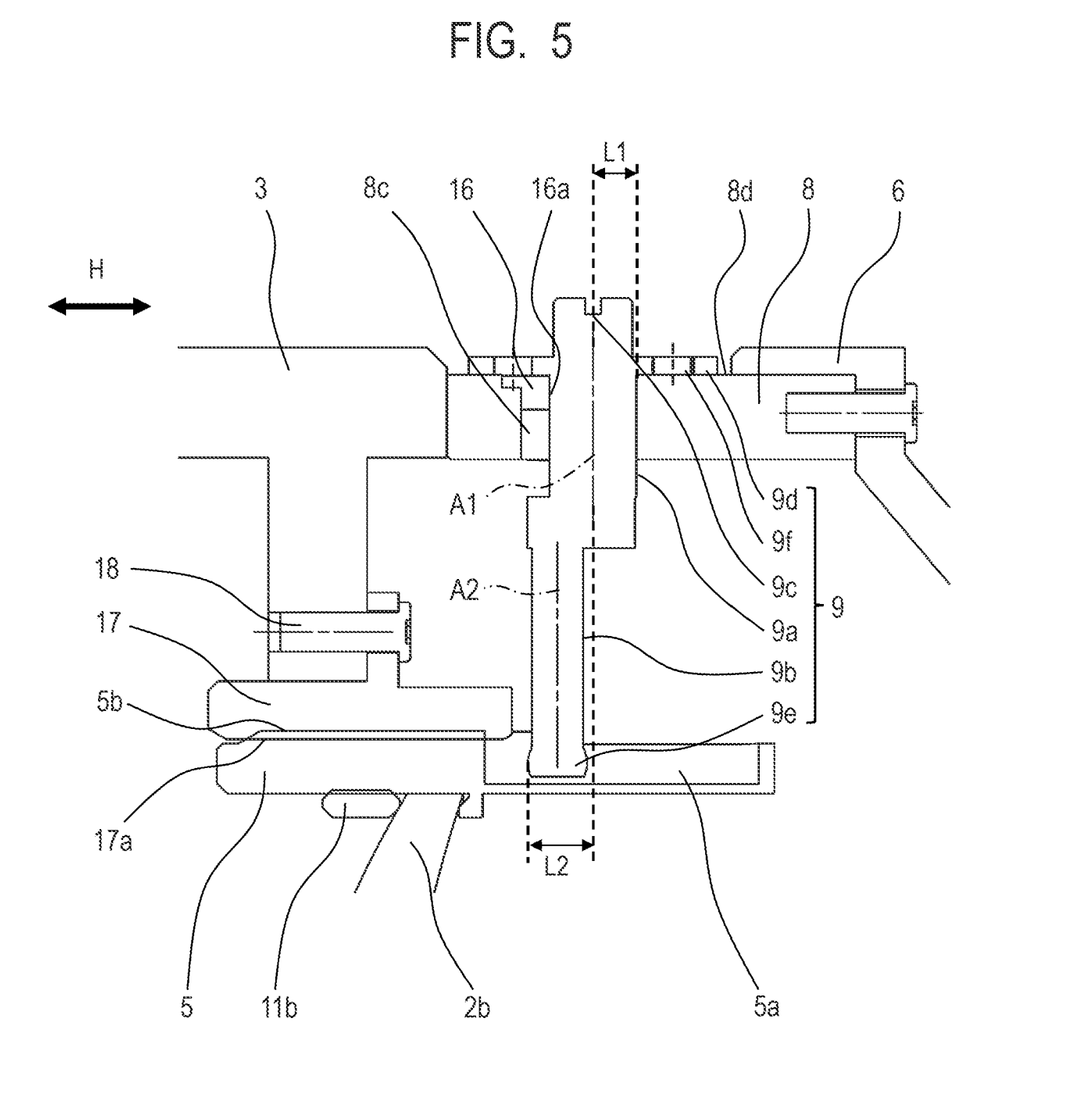
FIG. 5 is an enlarged cross-sectional view of the flange back adjusting unit of the embodiment.

Next, the movable barrel 5, the fixed barrel 8, the operating member 9, and a cap member 16 (first cap member) will be described with reference to FIGS. 3 to 5. FIG. 3 is an exploded perspective view illustrating a state in which the operating member 9 is inserted into the fixed barrel 8. FIG. 4 is an enlarged view of a non-circular hole (hole) formed on the fixed barrel 8. FIG. 5 is an enlarged cross-sectional view of the flange back adjusting unit.

The movable barrel 5 has a substantially cylindrical shape, and the second pressing ring 11b for fixing the second lens 2b is screwed to an inner peripheral part, and a male helicoid screw part 5b having a plurality of threads and a linear groove 5a (guide portion) are formed along an optical axis direction H in an outer peripheral part.

A non-circular hole portion through which the operating member 9 penetrates is formed on the fixed barrel 8 so as to penetrate from the outer peripheral surface to an inner peripheral surface. The non-circular hole portion is formed of an arc portion 8a having a partial arc and an escape portion 8c connected to the arc portion 8a, and the overall shape thereof is substantially keyhole-shaped. A sliding surface 8b is formed on a part of the circular arc surface of the arc portion 8a, a rotating shaft portion 9a of the operating member 9 is fitted to the sliding surface 8b, the rotating shaft portion 9a slides smoothly on the sliding surface 8b, and the sliding surface 8b suppresses the falling of the rotating shaft portion 9a. And the escape portion 8c is formed so that an eccentric shaft portion 9b (eccentric portion) of the operating member 9 can be inserted therethrough. The escape portion 8c is formed along the optical axis direction H from the center of the rotating shaft portion 9a of the arc portion 8a. That is, the longitudinal direction of the non-circular hole portion is along the optical axis direction H. The non-circular hole portion is formed into the substantially keyhole-shaped by integrally forming the sliding surface 8b and the escape portion 8c, so that the operating member 9 can be inserted into the fixed barrel 8. In this manner, the operating member 9 is disposed so as to penetrate through the fixed barrel 8 and can be rotated.

The operating member 9 comprises the rotating shaft portion 9a including a rotational axis A1 for rotating operation, the eccentric shaft portion 9b being eccentric from the rotational axis A1, a groove portion 9c, a disk portion 9d, and an engaging portion 9e. Further, an arc groove 9f is formed through the disk portion 9d. The rotating shaft portion 9a is coaxial with the rotational axis A1, and the eccentric shaft portion 9b is parallel to the rotating shaft portion 9a and protrudes eccentrically from the rotational axis A1. That is, the eccentric shaft portion 9b extends in a direction closer to an optical axis O than the rotating shaft portion 9a. And the engaging portion 9e is formed at the distal end of the eccentric shaft portion 9b. The engaging portion 9e is engaged with the linear groove 5a formed on the outer periphery of the movable barrel 5 along the optical axis O, and the engaging portion 9e engaged with the linear groove 5a includes a spherical surface in contact with the linear groove 5a, and is substantially spherical at least in a range in contact with the wall of the linear groove 5a. And at least a part of the engaging portion 9e is located outside the rotating shaft portion 9a in the direction orthogonal to the rotational axis A1. Since a distance L2 from the rotational axis A1 to the outermost surface of the engaging portion 9e is longer than a radius L1 of the rotating shaft portion 9a, the shape of the operating member 9 does not increase the size of the lens apparatus 1, and it is possible to secure a larger amount of flange back adjustment than before.

The groove portion 9c is a groove for rotating by inserting a tool such as a flat head screwdriver when adjusting the optical characteristic (when adjusting the flange back). The disk portion 9d abuts on a plane portion 8d on the outer periphery of the fixed barrel 8, and the operating member 9 is arranged on the fixed barrel 8 so as to be smoothly rotatable around the rotational axis A1 orthogonal to the optical axis O.

After the eccentric shaft portion 9b of the operating member 9 is inserted into the escape portion 8c of the fixed barrel 8, the cap member 16 is arranged in the non-circular hole portion. More specifically, the cap member 16 is inserted into the escape portion 8c. The cap member 16 is fixed to the fixed barrel 8 by bonding with an adhesive, bonding with a double-sided tape, or press-fitting. The material of the cap member 16 is metal, resin or rubber. The cap member 16 is formed with an arc-shaped sliding surface 16a on which the rotating shaft portion 9a of the operating member 9 slides.

A female helicoid 17 is connected to the front fixed barrel 3 by a plurality of screws 18. The female helicoid 17 is formed with a female helicoid screw part 17a having a plurality of threads on an inner peripheral part. The male helicoid screw part 5b of the movable barrel 5 is screwed to the female helicoid screw part 17a, and the movable barrel 5 is moved along the optical axis O by the rotation of the movable barrel 5 around the optical axis O by a conversion mechanism (mechanism) for converting the rotational movement by a helicoid mechanism into linear movement. Although the conversion mechanism may be a cam mechanism or the helicoid mechanism.

Figure 6:
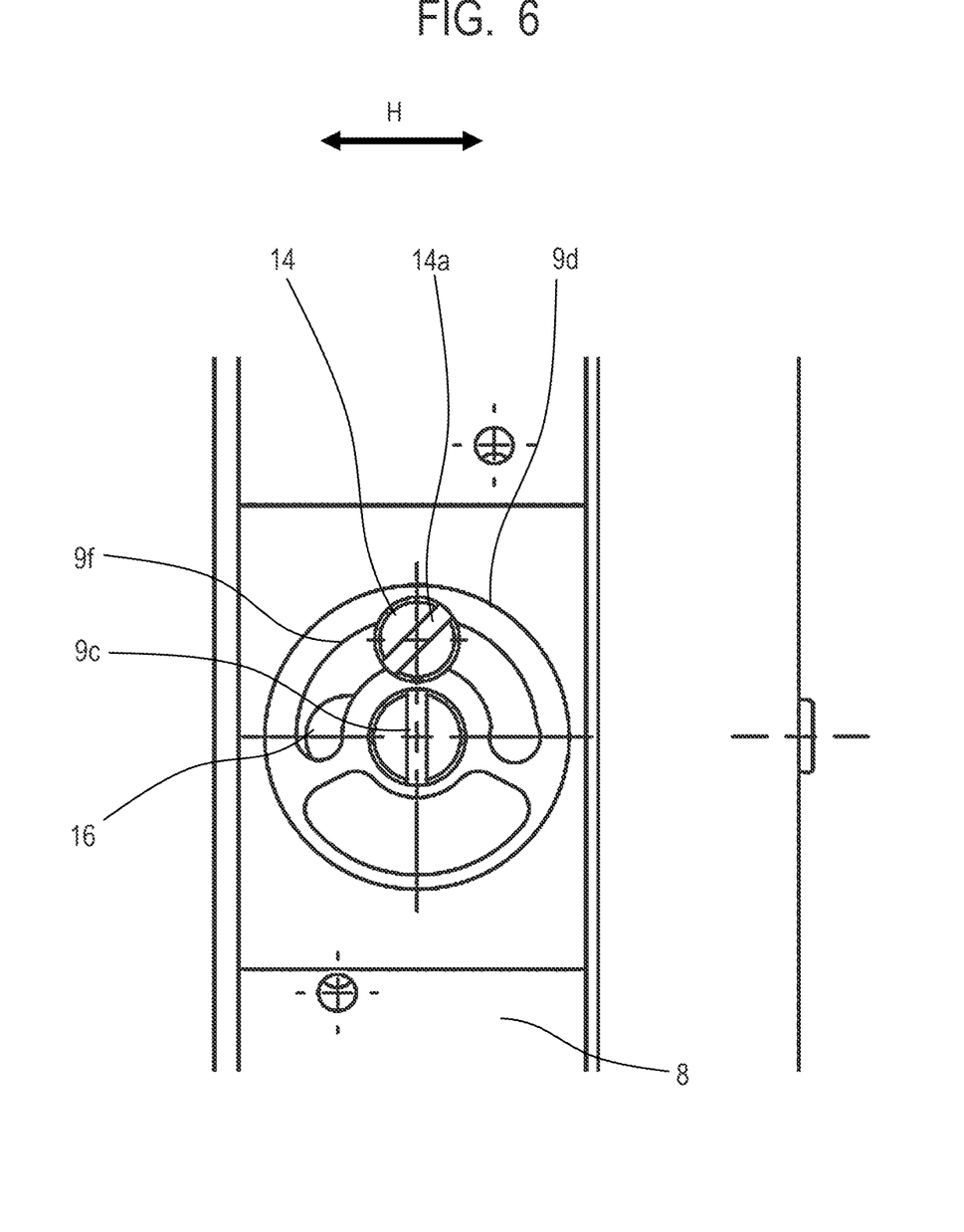
FIG. 6 is an enlarged view of the operating member (9) of the embodiment.

FIG. 6 is an enlarged view of the operating member 9 assembled to the fixed barrel 8. The arc groove 9f having an arc of about 180° is formed in the disk portion 9d so as to penetrate the disc portion 9d. The lock screw 14 is inserted into the arc groove 9f and screwed into a screw hole 8e (refer to FIG. 4) of the fixed barrel 8.

The adjustment reference state in which the flange back adjustment section is positioned substantially at the center of the adjustment range is a state in which the rotational axis A1 of the rotating shaft portion 9a and the center axis A2 of the eccentric shaft portion 9b are most distant in the optical axis direction H (for example, refer to FIG. 5). A groove portion 14a is formed on a head portion of the lock screw 14, and the groove portion 14a is a groove for rotating the lock screw 14 by inserting a tool such as a flat head screwdriver. When the lock screw 14 is rotated toward the optical axis O, the disk portion 9d of the operating member 9 is sandwiched between the plane portion 8d on the outer periphery of the fixed barrel 8 and the head portion of the lock screw 14. The lock screw 14 is screwed into the screw hole 8e formed on the fixed barrel 8 to fix the operating member 9 to the fixed barrel 8 so that the operating member 9 is rotationally operated.

Referring to FIGS. 2, 5, and 6, a method of adjusting the flange back in the lens apparatus 1 having the above configuration will be described below.

First, the rubber cap 12 of the flange back adjusting unit is removed, and the exposed lock screw 14 is loosened by using a tool such as a flat head screwdriver. By loosening the lock screw 14, the holding of the disk portion 9d of the operating member 9 is released, so that the operating member 9 becomes rotatable.

Next, the groove portion 9c of the operating member 9 is rotated by using a tool such as a minus driver. Since the rotating operation range is restricted by the contact between the lock screw 14 and the groove end of the arc groove 9f, the rotating operation range is a range of about 90° in each of the clockwise and counterclockwise from the adjustment reference state. By rotating the operating member 9, the engaging portion 9e slides on the movable barrel 5 along the linear groove 5a and rotates the movable barrel 5 around the optical axis O.

The rotation is converted into linear motion by the conversion mechanism of the helicoid mechanism, and the movable barrel 5 is moved along the optical axis O. Since the back focus is changed by moving the movable barrel 5 in the optical axis direction H, the flange back can be adjusted by rotating the operating member 9 as described above. After a flange back adjustment optical system (movable barrel 5 for holding the second lens 2b) is adjusted to an appropriate position, the lock screw 14 is tightened to fix the adjustment position. Finally, the operation of the flange back adjustment is completed by fitting the rubber cap 12 of the flange back adjustment section.

As described above, the lens apparatus 1 can be configured to be small in size and space saving without increasing the size of the flange back adjusting unit even if the flange back adjusting amount of the movable barrel 5 is increased. Further, since the cap member 16 is provided in the escape portion 8c of the non-circular hole portion of the fixed barrel 8, a dust-proof and a drip-proof to the inside of the lens apparatus 1 are improved. Further, by providing the sliding surface 16a on which the rotating shaft portion 9a of the operating member 9 slides on the cap member 16, the inclination of the operating member 9 in the optical axis direction H can be suppressed, and the accuracy at the time of adjusting the flange back can be improved. According to this embodiment, it is possible to provide an optical apparatus advantageous in terms of adjustment of optical characteristics and miniaturization.

Further, since the escape portion 8c of the non-circular hole portion is formed along the optical axis direction H from the center of the rotating shaft portion 9a of the operating member 9, even if the operating member 9 falls toward the escape portion 8c side, the engaging portion 9e only falls along the optical axis direction H. As a result, the rotating working force of the movable barrel 5 is hardly generated. Thus, since the amount of the flange back is hardly changed by the falling of the operating member 9, stable adjustment is made possible when the amount of the flange back is adjusted by rotating the operating member 9.

MODIFIED EXAMPLE

Figure 7:
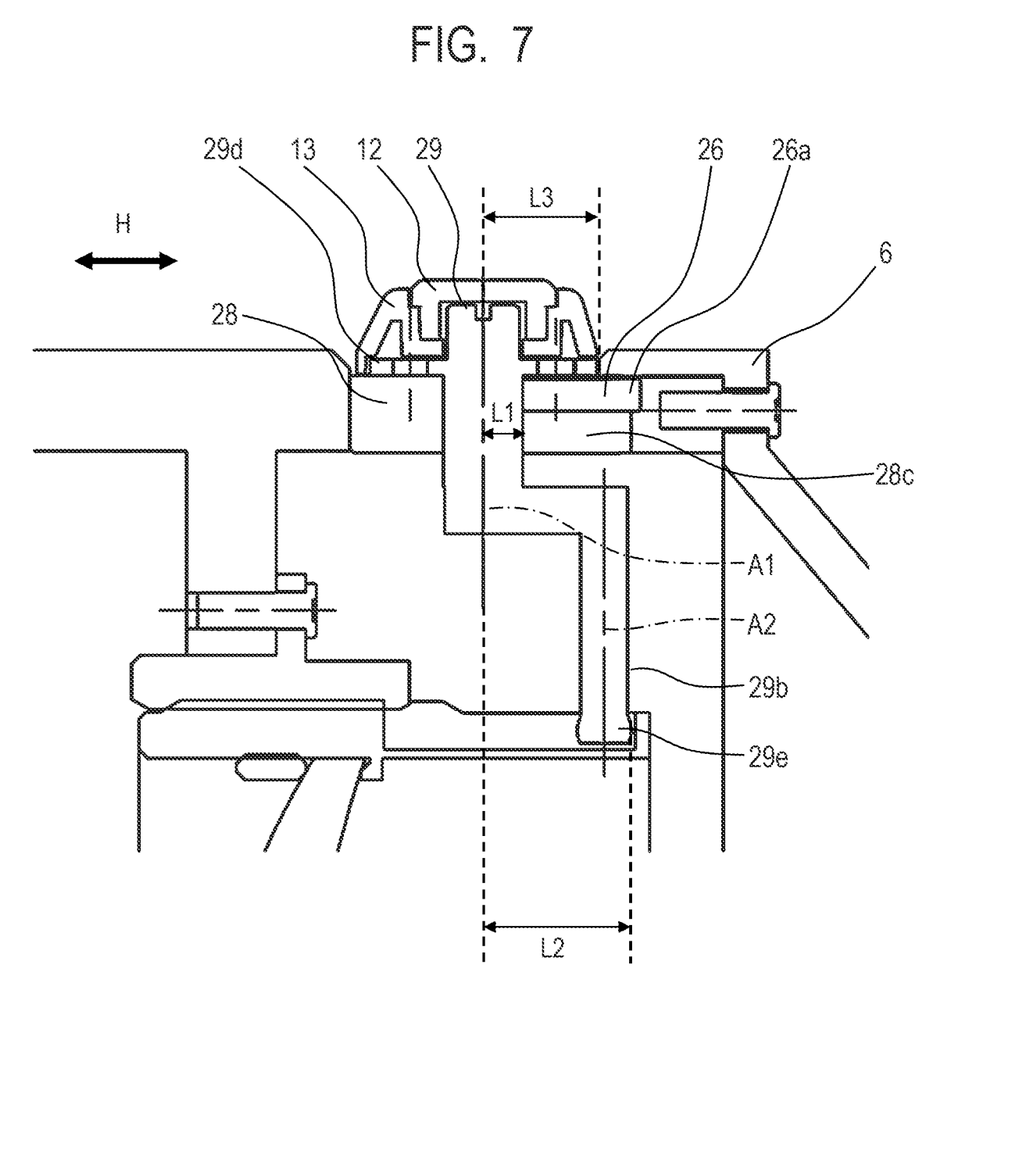
FIG. 7 is an enlarged cross-sectional view of a flange back adjusting unit according to a modification of the embodiment.
Figure 8:
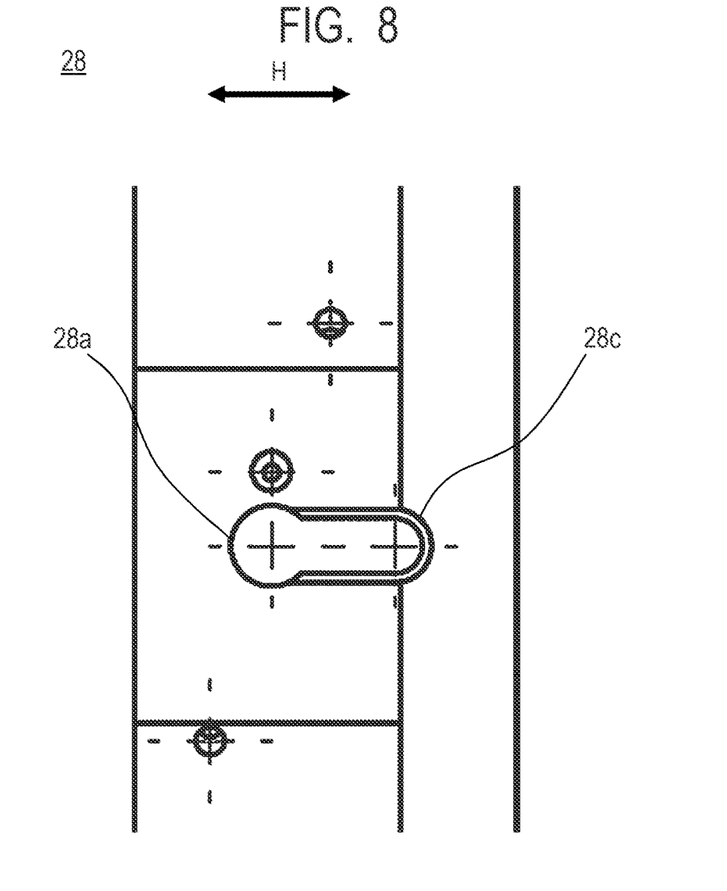
FIG. 8 is an enlarged view of a hole portion of a modified example of the embodiment.

FIG. 7 is an enlarged cross-sectional view of a flange back adjusting unit according to a modification of the present embodiment. FIG. 8 is an enlarged view of a non-circular hole (hole) formed on a fixed barrel 28 of the modification. This modification will be described with reference to FIGS. 7 and 8. It should be noted that the same components as those of the embodiment are denoted by the same reference numerals and the description thereof is omitted, and different components will be described.

When it is desired to further increase the flange back adjustment amount of the embodiment, the distance L2 from the rotational axis A1 to the outermost surface of an engaging portion 29e of an eccentric shaft portion 29b (eccentric portion) may be set larger than a distance L3 from the rotational axis A1 of an operating member 29 to an outer surface of a disk portion 29d (flange portion). The relationship between the distance L2 and the distance L3 is L2≥L3. That is, at least a part of the engaging portion 29e is located outside the disk portion 29d of the operating member 29 which does not penetrate the fixed barrel 28 in the direction orthogonal to the rotational axis A1. In such a configuration, an escape portion 28c connected to an arc portion 28a constituting the non-circular hole portion formed on the fixed barrel 28 for inserting the operating member 29 becomes large. As the size of the escape portion 28c increases, the size of a cap member 26 (first cap member) also increases, but the size of the flange back adjusting unit does not increase.

This is because the flange back adjusting unit can be formed without enlarging the rubber cap 12 and the cover member 13. First, the cap member 26 is becomes large and protrudes from the outer surface of the disk portion 29d of the operating member 29 in the optical axis direction H, but since a protruding portion 26a of the cap member 26 is hidden by the rear fixed barrel 6, there is little influence on the appearance. Since the cap member 26 is fixed to the fixed barrel 28 by adhesion by an adhesive, adhesion by a double-sided tape, or press-fitting, even if water or dust enters from a gap between the cover member 13 and the rear fixed barrel 6, the water or the dust does not enter the inside of the fixed barrel 28. According to this modification, it is possible to provide an optical apparatus advantageous in terms of adjustment of optical characteristics and miniaturization.

Figure 9:
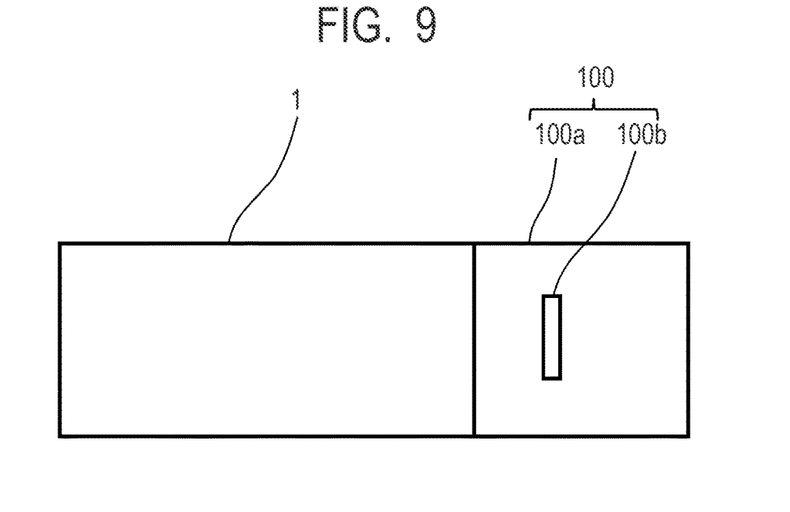
FIG. 9 is a schematic diagram illustrating a configuration example of an image pickup apparatus.

FIG. 9 is a schematic view illustrating a configuration example of a camera apparatus 100 (image pickup apparatus) using the lens apparatus 1 according to the embodiment of the present disclosure. The image pickup apparatus illustrated in FIG. 9 includes the lens apparatus 1 and the camera apparatus 100 including a camera body 100a having an image pickup element 100b for capturing an image formed by the lens apparatus 1. The image pickup apparatus may be configured such that the lens apparatus 1 is detachably mounted from the camera body 100a (image pickup apparatus body) of the camera apparatus 100.

Although preferred embodiments, modifications, and applications of the present disclosure have been described above, the present disclosure is not limited to these embodiments, modifications, and applications, and various modifications and modifications are possible within the scope of the present disclosure.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-145089, filed Sep. 7, 2021 which is hereby incorporated by reference herein in its entirety.

What is claimed is:
1. An optical apparatus comprising:
a fixed barrel;

a movable barrel disposed inside the fixed barrel and holding an optical element;

a mechanism configured to move the movable barrel along an optical axis by rotation of the movable barrel around the optical axis; and an operating member disposed through the fixed barrel and rotationally operated, wherein the operating member comprises a rotating shaft and an engaging portion eccentric from the rotating shaft, the rotating shaft being rotated with the operating member being rotationally operated, the engaging portion being engaged with a guide formed in the movable barrel along the optical axis;

at least a part of the engaging portion is located outside the rotating shaft in a direction orthogonal to the rotating shaft;

rotation of the operating member causes the engaging portion to slide on the guide, the movable barrel to rotate around the optical axis, and the mechanism to move the movable barrel along the optical axis, and at least a part of the engaging portion is located, in the direction orthogonal to the rotating shaft, outside a flange portion of the operating member which is disposed on an outer surface of the fixed barrel.

2. The optical apparatus according to claim 1, wherein a non-circular hole through which the operating member is disposed is formed in the fixed barrel.

3. The optical apparatus according to claim 2, wherein a first cap member is disposed in the hole.

4. The optical apparatus according to claim 3, wherein the first cap member includes a sliding surface on which the rotating shaft slides with the operating member being rotationally operated.

5. The optical apparatus according to claim 2, wherein a longitudinal direction of the hole is along the optical axis.

6. The optical apparatus of claim 1, wherein the mechanism comprises a cam mechanism or a helicoid mechanism.

7. The optical apparatus according to claim 1, wherein the engaging portion includes a spherical surface in contact with the guide.

8. The optical apparatus according to claim 1, further comprising a fixing member configured to fix the operating member to the fixed barrel so that the operating member is not rotationally operated.

9. The optical apparatus according to claim 8, further comprising a second cap member configured to cover the operating member and the fixing member.

10. The optical apparatus according to claim 1, wherein the optical apparatus is detachably attached to an image pickup apparatus body.

11. An image pickup apparatus comprising:

an optical apparatus; and an image pickup element configured to pick up an image formed by the optical apparatus, wherein the optical apparatus comprising:

a fixed barrel;

a movable barrel disposed inside the fixed barrel and holding an optical element;

a mechanism configured to move the movable barrel along an optical axis by rotation of the movable barrel around the optical axis; and an operating member disposed through the fixed barrel and rotationally operated, wherein the operating member comprises a rotating shaft and an engaging portion eccentric from the rotating shaft, the rotating shaft being rotated with the operating member being rotationally operated, the engaging portion being engaged with a guide formed in the movable barrel along the optical axis;

at least a part of the engaging portion is located outside the rotating shaft in a direction orthogonal to the rotating shaft;

rotation of the operating member causes the engaging portion to slide on the guide, the movable barrel to rotate around the optical axis, and the mechanism to move the movable barrel along the optical axis, and at least a part of the engaging portion is located, in the direction orthogonal to the rotating shaft, outside a flange portion of the operating member which is disposed on an outer surface of the fixed barrel.

* * * * *